United States Patent
Dietz (10) Patent No.: US 8,702,832 B2
(45) Date of Patent: Apr. 22, 2014

(54) SECURABLE MOUNTING MATERIAL AND METHOD OF MAKING AND USING THE SAME

(75) Inventor: Peter T. Dietz, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 273 days.

(21) Appl. No.: 12/663,720

(22) PCT Filed: Apr. 28, 2008

(86) PCT No.: PCT/US2008/061750
§ 371 (c)(1),
(2), (4) Date: Jul. 15, 2010

(87) PCT Pub. No.: WO2008/154078
PCT Pub. Date: Dec. 18, 2008

(65) Prior Publication Data
US 2010/0186359 A1   Jul. 29, 2010

Related U.S. Application Data (60) Provisional application No. 60/992,458, filed on Dec. 5, 2007, provisional application No. 60/943,681, filed on Jun. 13, 2007.

(51) Int. Cl.
| | | |
|---|---|---|
| *B01D 39/14* | (2006.01) | |
| *B01D 39/06* | (2006.01) | |
| *B01D 24/00* | (2006.01) | |
| *B01D 50/00* | (2006.01) | |
| *F01N 3/00* | (2006.01) | |

(52) U.S. Cl.
USPC ............. 55/523; 55/522; 55/524; 422/169; 422/170; 422/171; 422/172; 422/177; 422/178; 422/179; 422/180; 422/181; 422/182; 60/297

(58) Field of Classification Search
USPC ............ 55/522–524; 422/169–172, 177–182; 60/297
See application file for complete search history.

(56) References Cited

U.S. PATENT DOCUMENTS

| | | |
|---|---|---|
| 3,001,571 A | 9/1961 | Hatch |
| RE27,747 E | 9/1973 | Johnson |

(Continued)

FOREIGN PATENT DOCUMENTS

| | | |
|---|---|---|
| CN | 1771383 | 5/2006 |
| DE | 3514150 C1 | 4/1986 |

(Continued)

OTHER PUBLICATIONS

Communication Pursuant to Article 94(3) EPC in application 08 795 823.7-2111, dated Apr. 16, 2010.

(Continued)

*Primary Examiner* — Amber Orlando
(74) *Attorney, Agent, or Firm* — Bradford B. Wright (57) ABSTRACT

A securable mounting material comprises: a mounting material comprising inorganic fibers and having a major surface; and a layer of thermally activatable adhesive inwardly disposed on the inorganic fibers proximate the major surface. The thermally activatable adhesive comprises at least one compound represented by the formula: $(M^{m+})_d ((Z_p O_q (OH)_r)^{n-})_e \cdot (H_2O)_f$. M represents a cationic species other than $H^+$; O represents oxygen; Z represents boron or phosphorus; f is a real number greater than or equal to zero; d, n, q, and r are integers greater than or equal to zero; e, m, and p are integers greater than or equal to one; and d times m equals e times n. The mounting material is useful in pollution control devices. A method of making the mounting material is also disclosed.

2 Claims, 2 Drawing Sheets

(56) References Cited

U.S. PATENT DOCUMENTS

| | | |
|---|---|---|
| 3,795,524 A | 3/1974 | Sowman |
| 3,798,006 A | 3/1974 | Balluff |
| 3,916,057 A | 10/1975 | Hatch et al. |
| 3,948,611 A | 4/1976 | Stawsky |
| 4,047,965 A | 9/1977 | Karst et al. |
| 4,142,864 A | 3/1979 | Rosynsky et al. |
| 4,143,117 A | 3/1979 | Gaysert |
| 4,156,533 A | 5/1979 | Close et al. |
| 4,163,041 A | 7/1979 | Gaysert |
| 4,305,992 A | 12/1981 | Langer et al. |
| 4,396,664 A | 8/1983 | Mochida et al. |
| 4,521,333 A | 6/1985 | Graham et al. |
| 4,683,010 A | 7/1987 | Hartmann |
| 4,693,338 A | 9/1987 | Clerc |
| 4,929,429 A | 5/1990 | Merry |
| 4,999,168 A | 3/1991 | Ten Eyck |
| 5,008,086 A | 4/1991 | Merry |
| 5,207,989 A | 5/1993 | MacNeil |
| 5,212,279 A * | 5/1993 | Nomura et al. ............ 528/184 |
| 5,332,609 A | 7/1994 | Corn |
| 5,380,580 A | 1/1995 | Rogers et al. |
| 5,714,237 A | 2/1998 | Cooprider et al. |
| 5,736,109 A | 4/1998 | Howorth et al. |
| 5,853,675 A | 12/1998 | Howorth |
| 5,882,608 A | 3/1999 | Sanocki et al. |
| 6,245,301 B1 | 6/2001 | Stroom et al. |
| 6,368,394 B1 | 4/2002 | Hughes |
| 6,613,294 B2 | 9/2003 | Sanocki et al. |
| 6,864,199 B2 | 3/2005 | Doza |
| 6,966,945 B1 | 11/2005 | Mazany et al. |
| 6,967,006 B1 | 11/2005 | Wirth et al. |
| 7,501,099 B2 * | 3/2009 | Sanocki et al. ............ 422/179 |
| 7,556,666 B2 * | 7/2009 | Kunieda ..................... 55/523 |
| 7,820,117 B2 | 10/2010 | Peisert |
| 7,851,403 B2 * | 12/2010 | Kunieda et al. ............ 502/325 |
| 8,133,443 B2 | 3/2012 | Merry |
| 2004/0057879 A1 | 3/2004 | Aizawa et al. |
| 2004/0234428 A1 * | 11/2004 | Tanahashi et al. ........... 422/180 |
| 2006/0154040 A1 | 7/2006 | Merry |
| 2006/0178064 A1 * | 8/2006 | Balthes et al. ................ 442/59 |
| 2006/0230732 A1 * | 10/2006 | Kunieda ..................... 55/523 |
| 2006/0286014 A1 | 12/2006 | Peisert et al. |
| 2007/0084171 A1 | 4/2007 | Kaneko |
| 2007/0107395 A1 * | 5/2007 | Zuberi et al. ............... 55/523 |
| 2008/0118682 A1 * | 5/2008 | Ido et al. .................... 428/34.1 |
| 2008/0236122 A1 * | 10/2008 | Ito .............................. 55/523 |
| 2009/0291837 A1 * | 11/2009 | Ohno et al. .................. 502/71 |
| 2010/0304152 A1 * | 12/2010 | Clarke ....................... 428/438 |

FOREIGN PATENT DOCUMENTS

| | | |
|---|---|---|
| EP | 0 639 700 B1 | 2/1995 |
| EP | 0 639 701 A1 | 2/1995 |
| EP | 0 639 702 A1 | 2/1995 |
| EP | 0 835 365 B1 | 3/2000 |
| EP | 1 296 030 A1 | 3/2003 |
| FR | 2 869 948 | 11/2005 |
| GB | 1 476 183 | 6/1977 |
| JP | 49-1130274 A | 10/1974 |
| JP | 4-348178 | 12/1992 |
| JP | 2000-240439 | 9/2000 |
| JP | 2001-164198 | 6/2001 |
| JP | 2003-097262 A | 4/2003 |
| JP | 2005-074243 | 3/2005 |
| JP | 2006-513966 | 4/2006 |
| JP | 2006-516699 | 7/2006 |
| WO | WO 97/48890 A1 | 12/1997 |
| WO | WO 00/11098 A1 | 3/2000 |
| WO | WO 2004/064996 A2 | 8/2004 |
| WO | WO 2004/070176 A1 | 8/2004 |
| WO | WO 2005/105427 A1 | 11/2005 |
| WO | WO 2007/143437 A2 | 12/2007 |
| WO | WO 2008/103525 A2 | 8/2008 |
| WO | WO 2008/154078 A1 | 12/2008 |
| WO | WO 2008/156918 A1 | 12/2008 |
| WO | WO 2008/156942 A1 | 12/2008 |

OTHER PUBLICATIONS

PCT International Search Report and Written Opinion of the International Searching Authority, PCT/US2008/061750, mailed Sep. 19, 2008, 10 pages.

Chung, "Review—Acid aluminum phosphate for the binding and coating of materials", Journal of Materials Science, 2003, pp. 2785-2791, vol. 38.

Co-pending U.S. Appl. No. 12/526,564, entitled "Flexible Fibrous Material, Pollution Control Device, and Methods of Making the Same," 371(c) date Aug. 10, 2009.

Co-pending U.S. Appl. No. 12/663,613, entitled "Repositionable Mounting Material, Pollution Control Device, and Methods of Making the Same," 371(c) date Dec. 8, 2009.

Co-pending U.S. Appl. No. 12/663,712, entitled "Securable Mounting Material and Method of Making and Using the Same," transmitted Dec. 9, 2009.

* cited by examiner

SECURABLE MOUNTING MATERIAL AND METHOD OF MAKING AND USING THE SAME

CROSS-REFERENCE TO RELATED APPLICATIONS

This application is a national stage filing under 35 U.S.C. 371 of PCT/US2008/061750, filed Apr. 28, 2008, which claims priority to U.S. Provisional Application No. 60/943,681, filed Jun. 13, 2007, and U.S. Provisional Application No. 60/992,458, filed Dec. 5, 2007, the disclosures of which are incorporated by reference in their entirety herein.

BACKGROUND

Pollution control devices are employed on motor vehicles to control atmospheric pollution. Two types of such devices, catalytic converters and diesel particulate filters or traps, are currently in widespread use. Catalytic converters contain a catalyst, which is typically coated onto a monolithic structure mounted in the converter. The monolithic structures (termed "monoliths") are typically ceramic, although metal monoliths have been used. The catalyst oxidizes carbon monoxide and hydrocarbons, and reduces the oxides of nitrogen in automobile exhaust gases to control atmospheric pollution. Diesel particulate filters or traps are generally wall flow filters which have honeycombed monolithic structures (also termed "monoliths"), typically made from porous crystalline ceramic material.

Typically, as constructed, each type of these devices has a metal housing which holds within it a monolithic structure or element that can be metal or ceramic, and is most commonly ceramic. The ceramic monolith generally has very thin walls to provide a large amount of surface area and is fragile and susceptible to breakage. Moreover, there is a current industry trend regarding ceramic monoliths used in automotive catalytic converters toward monoliths having smoother outer surfaces that makes it more difficult to maintain adhesion of the mounting material to the ceramic monolith during canning. Ceramic monoliths also typically have coefficients of thermal expansion that are an order of magnitude less than typical metal housings (for example, stainless steel housings) in which they would be contained in use. To avoid damage to the ceramic monolith from road shock and vibration, to compensate for the thermal expansion difference, and to prevent exhaust gases from passing between the monolith and the metal housing, ceramic mat or intumescent sheet materials are often disposed between the ceramic monolith and the metal housing.

SUMMARY

In one aspect, the present invention provides a securable mounting material comprising:
  a mounting material comprising inorganic fibers and having first and second opposed major surfaces; and
  a layer of a thermally activatable adhesive inwardly disposed on the mounting material proximate at least a portion of the first major surface, but not extending throughout the entirety of mounting material;
  wherein, on a dry weight basis, at least one compound represented by the formula comprises a majority of the thermally activatable adhesive, wherein
  each $M^{m+}$ independently represents a cationic species, other than $H^+$, having a positive charge of m+; and
  $(Z_pO_q(OH)_r)^{n-}$ represents a species having a charge of n-, wherein Z represents boron or phosphorus, and further wherein:
    f is a real number greater than or equal to zero;
    d, n, q, and r are integers greater than or equal to zero;
    e, m, and p are integers greater than or equal to one; and
    d times m equals e times n; and
  wherein the securable mounting material is flexible.

In certain embodiments, the layer of a thermally activatable adhesive does not contact the second major surface.

As used herein: the term "flexible" means capable of passing the Flexibility Test included hereinbelow; the term "layer" excludes anything that extends throughout the entire mounting material; and the superscript term "+" refers to positive charge, while the superscript term "−" refers to negative charge. In the case where d is zero, then n is necessarily zero and the quantity $(Z_pO_q(OH)_r)$ will have no net charge.

Securable mounting material according to the present invention may be adapted for use in a pollution control device. Accordingly, in another aspect, the present invention provides a pollution control device comprising: a housing; a pollution control element disposed within the housing; and the securable mounting material according to the present invention disposed adjacent to, or within, the housing. In another aspect, the present invention provides a method of making a pollution control device, the method comprising: disposing a securable mounting material according to the present invention adjacent to, or within, a housing having a pollution control element disposed within the housing.

In certain embodiments, the securable mounting material is disposed between the pollution control element and the housing.

In yet another aspect, the present invention provides a method of making a securable mounting material, the method comprising:
  providing a mounting material comprising inorganic fibers and a plurality of major surfaces, the plurality of major surfaces comprising a first major surface; and
  applying a dryable solution comprising a thermally activatable adhesive dissolved in a liquid vehicle to the inorganic fibers proximate the first major surface; and
  substantially drying the dryable solution to provide a layer comprising the thermally activatable adhesive inwardly disposed proximate the first major surface, but not extending throughout the entirety of mounting material;
  wherein, on a dry weight basis, at least one compound represented by the formula comprises a majority of the thermally activatable adhesive, wherein
  each $M^{m+}$ independently represents a cationic species, other than $H^+$, having a positive charge of m+; and
  $(Z_pO_q(OH)_r)^{n-}$ represents a species having a charge of n-, wherein Z represents boron or phosphorus, and further wherein:
    f is a real number greater than or equal to zero;
    d, n, q, and r are integers greater than or equal to zero;
    e, m, and p are integers greater than or equal to one; and
    d times m equals e times n; and
  wherein the securable mounting material is flexible.

In certain embodiments, said at least one compound is selected from the group consisting of boric acid, borate salts, phosphoric acid, phosphate salts, hydrates of the foregoing, and combinations thereof. In certain embodiments, each $M^{m+}$ is independently selected from the group consisting of metal cations and $NR_4^+$ wherein each R independently represents H or an alkyl group. In certain embodiments, the thermally activatable adhesive is essentially free of organic components. In certain embodiments, at least a portion of the inorganic fibers are bonded together by a binder. In certain of those embodiments, the binder comprises organic material.

In certain embodiments, the mounting material has a dry basis weight of from 0.4 to 15 kilograms per square meter. In certain embodiments, the mounting material further comprises an unexpanded intumescent material. In certain of those embodiments, the unexpanded intumescent material comprises vermiculite, graphite, or a combination thereof. In certain embodiments, the inorganic fibers comprise ceramic fibers. In certain embodiments, the layer of thermally activatable adhesive has an inward thickness of less than or equal to 0.3 centimeter. In certain embodiments, the layer of thermally activatable adhesive is inwardly disposed on the inorganic fibers proximate the major surface. In certain embodiments, the method further comprises adapting the securable mounting material for use in a pollution control device.

Securable mounting material according to the present invention is first of all flexible, which enables it to be wound around a typical monolith without fracture or breakage. Further, when used in pollution control devices such as those described hereinabove, the securable mounting material may be secured to the housing and/or monolith by heated exhaust gas thereby preventing slippage relative to the housing and/or monolith and maintaining a tight seal to the housing and/or monolith. By preventing slippage, it is typically possible to use less mounting material than is current practice in the art.

As used herein the term "dryable" means that any liquid vehicle present may be at least substantially removed by evaporation.

DETAILED DESCRIPTION

Figure 1:
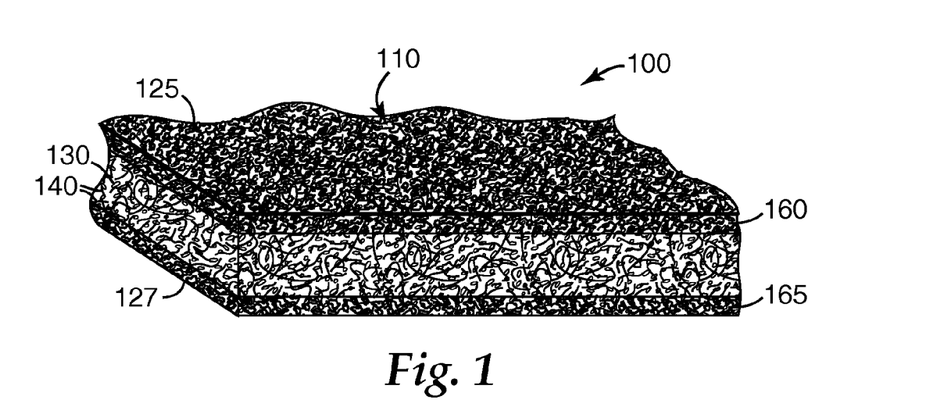
FIG. 1 is a schematic perspective view of an exemplary securable mounting material according to one embodiment the present invention.

FIG. 1 shows an exemplary securable mounting material 100 according to the present invention. Referring now to FIG. 1, mounting material 110 has inorganic fibers 140, optionally bonded together by a binder (not shown), and optional unexpanded intumescent particles 130. Mounting material 110 has first and second major surfaces 125, 127. Layer of thermally activatable adhesive 160 is inwardly disposed on the inorganic fibers 140 proximate first major surface 125, but does not extend throughout the entirety of mounting material 110; for example, it does not contact second major surface 127. A second, optional, layer of thermally activatable adhesive 165, which may have the same or different composition as layer of thermally activatable adhesive 160, is inwardly disposed on the inorganic fibers 140 proximate second major surface 127, but does not contact first major surface 125.

The mounting material comprises inorganic fibers that are sufficiently entangled and/or bonded together to form a cohesive web. The fibers may be entangled by a mechanical process (for example, needletacking or hydroentangling) and/or bonded together using a binder (for example, organic binder, inorganic binder, or a combination thereof). In some embodiments, the mounting material may also include organic fibers, although typically included in minor amounts, if at all.

Useful inorganic fibers include for example, fiberglass, ceramic fibers, non-oxide inorganic fibers such as stainless steel fibers or boron fibers, and mixtures thereof.

Useful ceramic fibers include, for example, aluminoborosilicate fibers, aluminosilicate fibers, alumina fibers, heat-treated versions thereof, and mixtures thereof. Examples of suitable aluminoborosilicate fibers include those commercially available under the trade designations "NEXTEL 312 CERAMIC FIBERS", "NEXTEL 440 CERAMIC FIBERS", and "NEXTEL 550 CERAMIC FIBERS" from 3M Company, St. Paul, Minn. Examples of suitable aluminosilicate fibers include those available under the trade designations "FIBERFRAX" 7000M from Unifrax Corp., Niagara Falls, N.Y., "CERAFIBER" from Thermal Ceramics, Augusta, Ga.; and "SNSC Type 1260 D1" from Nippon Steel Chemical Company, Tokyo, Japan. Examples of suitable commercially available alumina fibers include polycrystalline alumina fibers available from Saffil, Widnes, England under the trade designation "SAFFIL". Suitable ceramic fibers are also disclosed in U.S. Pat. No. 3,795,524 (Sowman) and U.S. Pat. No. 4,047,965 (Karst et al.).

Examples of other suitable inorganic fibers include: quartz fibers, amorphous and crystalline fibers of high silica content, alumina fibers and high alumina fibers, amorphous and crystalline alumina-silica fibers, oxide and non-oxide fibers, metallic fibers, fibers formed by blowing, spinning and pulling from a melt, sol-gel formed fibers, fibers formed from organic precursors, glass fibers, leached glass fibers, and other fibers of a substantially inorganic composition. Suitable inorganic fibers may also comprise a surface coating or a sizing of organic and inorganic material. Suitable inorganic fibers may obviously be used alone or in combination with other suitable inorganic fibers.

Generally speaking, inorganic fibers containing a substantial amount of shot are less expensive than shot-free, or partially cleaned inorganic fibers. However, shot-free inorganic fibers generally provide more resilient articles (for example, webs, sheets, mats), which better maintain holding forces at all temperatures including a return to room temperature. Accordingly, the mounting material may contain less than 50, 30, or even less than 15 percent by weight, or less, of shot based on the total dry weight of the mounting material.

Suitable organic binders for the mounting material are known in the art and include polymers and elastomers in the latex form (for example, natural rubber latexes, styrene-butadiene latexes, butadiene-acrylonitrile latexes, and latexes of acrylate and methacrylate polymers and copolymers). Typically, as is known in the art organic binders are flocculated onto the fibers of the web using a flocculating agent, especially during wet laid manufacturing processes. Suitable inorganic binders are known in the art for such use and include tetrasilisic fluorine mica, in either the water-swelling unexchanged form or after flocculation as the exchanged salt with a divalent or polyvalent cation, and bentonite.

Optionally, the mounting material may comprise one or more intumescent materials (which may be unexpanded, partially expanded, expanded, or a mixture thereof), typically, depending on the desired end use. For example, for use at temperatures above about 500° C., unexpanded vermiculite materials are suitable since they start to expand at a temperature range of from about 300° C. to about 340° C. This may be useful to fill the expanding gap between an expanding metal housing and a monolith in a catalytic converter. For use at temperatures below about 500° C., such as in diesel monoliths or particulate filters, expandable graphite or a mixture of expandable graphite and unexpanded vermiculite materials may be desired since expandable graphite starts to expand or intumesce at about 210° C. Treated vermiculites are also useful and typically expand at a temperature of about 290° C.

Examples of useful intumescent materials include unexpanded vermiculite flakes or ore, treated unexpanded vermiculite flakes or ore, partially dehydrated vermiculite ore, expandable graphite, mixtures of expandable graphite with treated or untreated unexpanded vermiculite ore, hydrobiotite, water swellable synthetic tetrasilicic fluorine type mica (for example, as described in U.S. Pat. No. 3,001,571 (Hatch)), alkali metal silicate granules (for example, as described in U.S. Pat. No. 4,521,333 (Graham et al.)), processed expandable sodium silicate (for example, insoluble sodium silicate commercially available under the trade designation "EXPANTROL" from 3M Company), and mixtures thereof. An example of a commercially available expandable graphite material is that available under the trade designation "GRAFOIL Grade 338-50" expandable graphite flake, from UCAR Carbon Co., Cleveland, Ohio. Treated unexpanded vermiculite flakes or ore includes unexpanded vermiculite treated by processes such as by being ion exchanged with ion exchange salts such as ammonium dihydrogen phosphate, ammonium nitrate, ammonium chloride, potassium chloride, or other suitable compounds as is known in the art.

Factors to consider in choosing an intumescent sheet material typically include the use temperature and the type of monolith (for example, ceramic monolith or metallic monolith). Suitable intumescent sheet materials typically comprise unexpanded vermiculite ore (commercially available, for example, from W. R. Grace and Co., Cambridge, Mass.), organic binder and/or inorganic binder, ceramic fibers, and filler (for example, clay (for example, kaolin) and hollow ceramic beads or bubbles). For example, U.S. Pat. No. 3,916,057 (Hatch et al.), discloses intumescent sheet material comprising unexpanded vermiculite, inorganic fibrous material, and inorganic binder. U.S. Pat. No. 4,305,992 (Langer et al.), discloses intumescent sheet material comprising ammonium ion-treated vermiculite, inorganic fibrous material, and organic binder. Further, intumescent sheet material is commercially available, for example, from the 3M Company of St. Paul, Minn., under the trade designation "INTERAM MAT MOUNT."

Typically, the mounting material comprises, on a dry weight basis, from 30 to 99.5 percent by weight of the inorganic fibers (for example, from 40 to 98.5 percent by weight, from 50 to 97 percent by weight, or from 60 to 97 percent by weight), from 0.5 to 12 percent by weight of an inorganic and/or organic binder (for example, from 0.5, 1.0, or 1.5 up to 3, 4, 5, 6, 7, 8, 9, 10, 11, or 12 percent by weight), and optionally up to 60 percent by weight of intumescent material, although compositions falling outside this range may also be used. In embodiments wherein intumescent material is not included in the mounting material, the percentage of inorganic fibers on a dry weight basis is typically at least 85 (for example, at least 90, 91, 92, 93, 94, 95 percent by weight, or more) percent, although lower weight percentages may also be used.

The mounting material may optionally contain one or more inorganic fillers, inorganic binders, organic binders, organic fibers, and mixtures thereof.

Examples of fillers include delaminated vermiculite, hollow glass microspheres, perlite, alumina trihydrate, calcium carbonate, and mixtures thereof. Fillers may be present in the mounting material at levels of up to 5 percent, up to 10 percent, or even up to 25 percent, or more, although use of high levels of fillers may tend to reduce the resiliency of the mounting material.

Examples of inorganic binders include micaceous particles, kaolin clay, bentonite clay, and other clay-like minerals. Inorganic binders may be present in the mounting material at levels up to 5 percent, up to 10 percent, up to 15 percent, or more, based on the dry weight of the mounting material, although use of high levels of inorganic binders may tend to reduce the resiliency of the mounting material.

Optionally, organic fibers (for example, staple fibers or fibrillated fibers) may be included in the mounting material of the present invention, for example, to provide wet strength during processing and dry strength and resiliency to mat and sheet mounting materials prior to canning. However, in general, it is desirable to minimize the content of such fibers as they contribute to objectionable burn off.

Other additives or process aides that may be included in mounting material according to the present invention include defoaming agents, surfactants, dispersants, wetting agents, salts to aid precipitation, fungicides, and bactericides. The mounting material is typically formulated to have physical properties suitable for in pollution control devices, although it may be formulated with different physical properties if desired.

The securable mounting material can be manufactured to any desired size and shape; for example, depending on specific application requirements. For example, automobile catalytic converters typically are smaller than diesel converters and generally require a correspondingly smaller mounting mat. Mounting mats can be stacked so that more than one layer of mat is wrapped around a monolith. Typically, the thickness of each intumescent securable mounting material is in a range of from about 1.5 mm to about 20 mm, although other thicknesses (for example, thinner or thicker) may be used.

Typically, the mounting material has a dry basis weight in a range of from about 400 g/m$^2$ to about 15 kg/m$^2$, although basis weights outside of this range may also be used. Typically, the mounting material has a maximum tensile strength of at least 50 kPa, 75 kPa, 100 kPa, 200 kPa, 300 kPa, or even at least 400 kPa, or more, but other tensile strengths may also be used.

The thermally activatable adhesive comprises (for example, consists essentially of, or even consists of) at least one compound represented by the formula:

$$(M^{m+})_d((Z_pO_q(OH)_r)^{n-})_e \cdot (H_2O)_f$$

capable of bonding the first major surface of the mounting material to the housing or monolith. In general, the compounds described by the above formula, other than boric acid, and phosphoric acid, are salts (for example, water-soluble or water-insoluble salts). On a dry weight basis, said at least one compound comprises a majority of the thermally activatable adhesive. For example, on a dry weight basis, said at least one compound may comprise greater than 50, 55, 60, 65, 70, 75, 80, 85, 90, or even greater than 95 percent by weight of the thermally activatable adhesive.

Each quantity $M^{m+}$ independently represents a cationic species, other than $H^+$, having a charge of $m^+$. Examples of suitable cationic species include: metal ions such as, for example, $Li^+$, $Na^+$, $K^+$, $Mg^{2+}$, $Ca^{2+}$, $Al^{3+}$, $Fe^{3+}$, $Cr^{3+}$, $Cr^{6+}$, $Ni^{2+}$, or $Zn^{2+}$; ammonium; and organic cations such as for example, sulfonium, phosphonium, and ammonium (for example, mono-, di-, tri-, or tetraalkylammonium, and benzalkonium); and organometallic cations. If alkali metal cations are used, they should be used judiciously as they may flux the inorganic fibers and have a detrimental effect on mat resiliency at temperatures above about 800° C.

The quantity f is a real number greater than or equal to zero (for example, 0, 1, 2, 3.4, 4.7, etc.) recognizing the existence of both integral and fractional hydrates. The quantities d, n, q, and r are integers greater than or equal to zero (for example, 0, 1, 2, 3, etc.). The quantities e, m, and p are integers greater than or equal to one (for example, 1, 2, 3, 4, etc.).

Each quantity $(Z_pO_q(OH)_r)^{n-}$ represents a species having a charge of n−, wherein Z represents boron or phosphorus. Since d·m=e·n, n is zero when d is zero. Examples of compounds having n equal to zero include boric acid, phosphoric acid, polyphosphoric acid, and hydrates thereof.

Examples of compounds that may be included in the thermally activatable adhesive include boric acid, borax, magnesium phosphate (for example, as prepared by sequential application of magnesium hydroxide and phosphoric acid and subsequent application), aluminum dihydrogen phosphate, and borate esters (which spontaneously hydrolyze to form boric acid on contact with water or steam).

Certain phosphate salts encompassed by the present invention may tend to rigidify the mounting material if heated to temperatures above about 150° C. Accordingly, they should be dried at lower temperatures.

In some embodiments, the thermally activatable adhesive further comprises at least one of colloidal silica or colloidal alumina, although such materials tend to impart rigidity to the securable mounting material and should typically be used judiciously in minor amounts.

To facilitate proper installation in pollution control devices, the thermally activatable adhesive may further comprise a colorant that visually indicates the located of the reinforcing material. Exemplary colorants include pigments and/or dyes.

The thermally activatable adhesive may optionally further contain additional non-interfering components such as colorants fragrances, thickeners, surfactants, dispersants, humectants, flame retardants, biocides, and the like.

To minimize initial burnout that may tend to reduce the effectiveness of components (for example, a catalytic converter monolith), the thermally activatable adhesive may have a low content of organic components (whether organic cationic species, organic anionic species, or neutral organic compounds). For example, on a dry weight basis, the thermally activatable adhesive may have an organic component content of less than 20, less than 10, or even less than 5 percent of the total weight of the thermally activatable adhesive. Advantageously, the thermally activatable adhesive may be formulated such that it is essentially free (that is, contains less than one percent of the total weight of the thermally activatable adhesive on a solids basis), or even completely free of organic components.

In formulating the thermally activatable adhesive and deciding the application levels care should be taken to ensure that the securable mounting material remains capable of passing the Flexibility Test as this is one significant benefit of the present invention. The specific choice of application level and manner of application will be readily determined by those of ordinary skill in the art and will typically depend, for example, on the mounting material used, the particular reinforcing material and its concentration in solution, and the desired depth of penetration into the mounting material from its first major surface.

The thermally activatable adhesive can typically be handled as a solution (for example, a dryable solution) of the abovementioned compound(s) in a liquid vehicle that is applied to the mounting material by a suitable method such as, for example, dipping, spraying, roll coating, or painting, and subsequent removal of the liquid vehicle. The liquid vehicle may comprise, for example, water, organic solvent, or an aqueous vehicle (that is, containing water and a water soluble organic solvent). The thermally activatable adhesive may be applied over the entire first major surface, or only a portion thereof. For example, it may be applied as stripes or spots, which may further facilitate flexibility.

In some embodiments, minor amounts of colloidal material (for example, a silica or alumina sol) may also be present in the solution; however, such materials tend to impart stiffness to the securable mounting material, and should typically be used judiciously in minor amounts.

In some cases, it may be desirable to use two solutions in sequence, for example, if the compounds in each solution are reactive toward one another (for example, to cause precipitation).

Typically, a solution of the thermally activatable adhesive will have a solids content in a range of from about 1 to about 20 percent by weight, more typically from about 2 to about 15 percent, and still more typically in a range of from about 5 to about 10 percent, however higher or lower concentrations may be used as desired for specific material requirements (for example, up to about 85 percent by weight phosphoric acid may be used). In general, higher coating weights of the thermally activatable adhesive (for example, achieved by use of a higher concentration of thermally activatable adhesive in solution) lead to equal or better bonding, but lessened flexibility than lower coating weights. Accordingly, the inward depth of the layer of reinforcing material (that is, toward the center of the mounting material) and its total coating weight are typically kept to a minimum necessary to achieve a desired level of bonding. In contrast, a mounting material wherein the layer of reinforcing material is extended throughout the entirety of the mounting material (with a corresponding increase in the total coat weight of the reinforcing material) it loses a degree of flexibility and resiliency as compared to the securable mounting material of the present invention.

Typically, sufficient solution is applied proximate the major surface to ensure adequate bonding between the housing and/or monolith of a pollution control device and the mounting material. Once applied, the solution(s) penetrates into the interior of the mounting material, to form a layer leaving behind, after removal of the liquid vehicle, a layer of thermally activatable adhesive; for example, having an inward thickness (that is, distance from the major surface) of less than or equal to 0.5, 0.4, 0.33, 0.2, or even less than or equal to 0.1 centimeter, although greater inward thicknesses may also be used as long as the thermally activatable adhesive does not contact the second major surface of the mounting material.

Removal of the liquid vehicle may be accomplished by methods such as for example, evaporation at room temperature or at elevated temperature. Typically, lower drying temperatures are more desirable since heating at elevated temperatures (for example, above about 150° C.) may tend to rigidify the thermally activatable adhesive. Similarly, in some embodiments it may be desirable to include a humectant in the thermally activatable adhesive to improve flexibility.

Securable mounting materials according to the present invention may have any dimension and/or thickness. However, for use in pollution control devices the thickness of the securable mounting material, and likewise the mounting material is typically in a range of from 0.1 inch (0.3 cm), 0.15 inch (0.38 cm), or 0.2 inch (0.5 cm) up to 0.3 (0.8 cm), 0.5 (1.3 cm), 0.7 (1.8 cm) or 1 inch (2.5 cm), or more. Typically, the mounting material has a dry basis weight in a range of from 400, 700, 1000, 1500, or even 2000 grams per square meter (gsm) up to 5000, 10000, or 15000 gsm, or more. For example, non-intumescent mounting materials typically have a dry basis weight of from 400 to 2500 gsm, more typically 1000 to 1800 gsm. Intumescent mounting materials typically have a dry basis weight of from 1200 to 15000 gsm, more typically 2400 to 8000 gsm.

The mounting material may be made by any suitable technique including; for example, using air laid or wet laid techniques that are well known in the art.

In one exemplary useful method, a slurry in water (for example, typically greater than 95 percent by weight water) of the inorganic fibers, and an organic polymer, is prepared and combined with a flocculent. Optional ingredients (for example, defoaming agent, intumescent material or filler) are then added (if used) and the slurry is then formed into mounting material by traditional wet-laid non-woven papermaking techniques. Briefly, this process includes mixing the components and pouring the slurry onto a wire mesh or screen to remove most of the water. The formed sheet is then dried to form the mounting material. The mounting material may then be converted to desired forms such as sheets and mats. The process may be carried out in a step-wise, batch, and/or continuous fashion.

When making the slurry, higher density materials such as the optional intumescent material and higher density fillers (if used) may be added to the slurry in a smaller volume mixing vessel at a constant rate just prior to the depositing step. Slurries containing fillers and intumescent materials are agitated sufficiently so to prevent these particles from settling out in the mixing tank prior to pouring the slurry onto the mesh. Such slurries should typically be partially dewatered almost immediately after being deposited on the mesh so to prevent undesirable settling of the higher density particles. Vacuum dewatering of the slurries is desirable. Useful drying methods include wet pressing the dewatered slurries through compression or pressure rollers followed by passing the material through heated rollers and forced hot air drying as is known in the art.

Securable mounting material according to the present invention is useful in pollution control devices as mounting material (for example, a mounting mat) for mounting a monolith in a housing and/or for end cone insulation. For example, the securable mounting material may be disposed between the monolith and the housing by wrapping the monolith with the securable mounting material and inserting the wrapped monolith into the housing, or by wrapping the inner end cone housing with the securable mounting material and then welding the outer end cone housing to the inner end cone housing.

Figure 2:
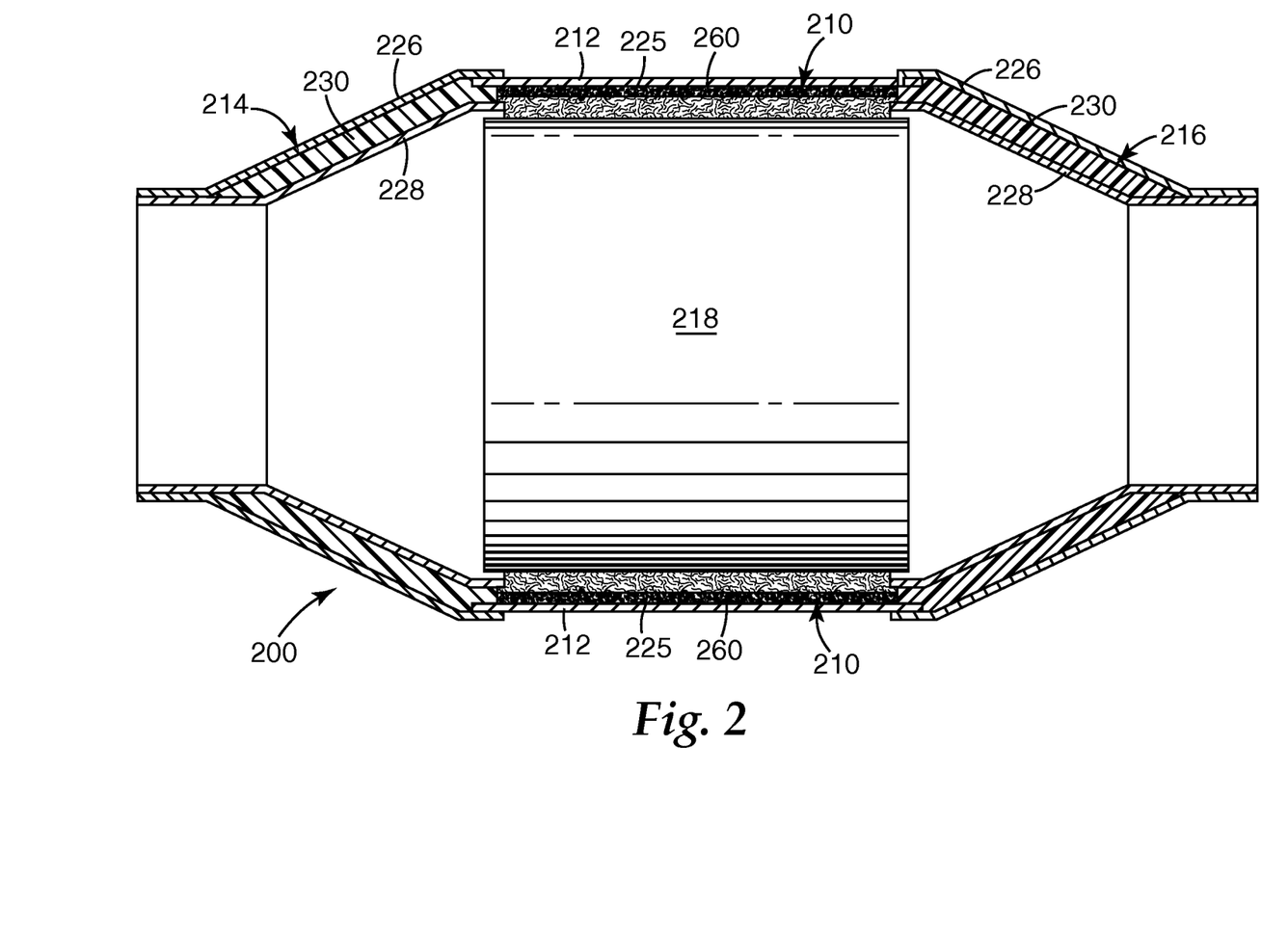
FIG. 2 is a cross-sectional view of an exemplary pollution control device according to one embodiment of the present invention.

Referring now to FIG. 2, exemplary pollution control device 200 includes housing 212 and has a generally conical inlet 214 and outlet 216 (that is, commonly referred to as end cones). Housing 212, which is commonly referred to as a can or a casing, is usually made of metal (for example, stainless steel). Disposed within housing 212 is monolith 218 usually made of a ceramic or metallic material, and which may include a catalyst. Securable mounting material 210 surrounds monolith 218. A first major surface 225 of securable mounting material 210 with layer of thermally activatable adhesive 260 contacts housing 212. Monolith 218 may be, for example, a catalytic converter element or a diesel particulate filter element.

Inlet 214 and outlet 216 include an inner end cone housing 228 and an outer end cone housing 226. Insulation material 230 is positioned between the inner end cone housing 228 and the outer end cone housing 226. Securable mounting material according to the present invention may be used as insulation material 230.

Many examples of pollution control devices are known in the art and include, for example, catalytic converters, end cone sub-assemblies, selective catalytic reduction (SCR) units, and diesel particulate traps and filters. Further details concerning such devices may be found, for example, in U.S. Pat. No. 5,882,608 (Sanocki et al.), U.S. Pat. No. 6,245,301 (Stroom et al.) and RE 27,747 (Johnson), and in U.S. Publ. Pat. Appln. No. 2006/0154040 A1 (Merry).

The thermally activatable adhesive is activatable by heat. Once activated (for example, from hot exhaust gases, flame, or an oven prior to installation on the vehicle), it can secure the securable mounting material to the housing, or other portion, of a pollution control device. Typically, a temperature in a range of from about 150° C. to about 300° C. activates the thermally activatable adhesive, although temperatures outside this range may also be used. Activation may be achieved by exposure to the inherent temperature of a pollution control device (for example, a catalytic converter). In cases where a pollution control device has an operational temperature that is less than the activation temperature of the reinforcing material, heating the pollution control device to a temperature in excess of the activation temperature prior to installing it on a vehicle may be advantageous. Advantageously, by following the teachings of the present disclosure, it is generally possible to retain much of the resiliency characteristic of the mounting material.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the Examples and the rest of the specification are by weight.

The abbreviations listed in Table 1 (below) are used throughout the Examples.

TABLE 1

| ABBRE-VIATION | MATERIAL |
|---|---|
| BX | borax, available under the trade designation "20-MULE TEAM BORAX" from Dial Corp., Scottsdale, AZ |
| MAP | aluminum dihydrogen phosphate, $Al(H_2PO_4)_3$, (50 weight percent in water), available from Alfa-Aesar, Ward Hill, MA |
| MAT1 | a non-intumescent ceramic fiber web (1000 grams per square meter, 7.2 mm thickness) available under the trade designation "INTERAM 1101HT" from 3M Company |
| MAT2 | a non-intumescent ceramic fiber web (1440 grams per square meter, 7.6 mm thickness) available under the trade designation "INTERAM 1535 HT" from 3M Company |
| MAT3 | an intumescent ceramic fiber web (4070 grams per square meter, 6.1 mm thickness) available under the trade designation "INTERAM 100" from 3M Company, St. Paul, MN |
| MGPHOS | a magnesium phosphate solution prepared by dissolving 25 grams of magnesium hydroxide into 200 grams of 42.5% phosphoric acid under constant mixing, then diluted with equal parts by weight of water and two drops of SURF2 per 100 grams of solution |
| CSIL | 30 weight percent colloidal silica available under the trade designation "NALCO 1030", Nalco Company, Naperville, IL |
| CAL | colloidal alumina, 20 wt. percent $Al_2O_3$, available under the trade designation "NYACOL AL20" from Nyacol Nanotechnologies, Ashland, MA |
| AS | aluminum sulfate, 50% solution, available from Hawkins Chemical, Minneapolis, MN 55413 |
| RIGW | an aqueous amorphous silica dispersion available under the trade designation "UNIFRAX RIGIDIZER W" from Unifrax Corporation, Niagara Falls, NY |

TABLE 1-continued

| ABBRE-VIATION | MATERIAL |
|---|---|
| SURF | nonionic surfactant available under the trade designation "ICONOL TDA-9" from BASF Corp., Florham Park, NJ |
| CB671 | alumina filled high temperature ceramic adhesive available under the trade designation "CERAMABOND 671" from Aremco Products, Valley Cottage, NY |
| PHOS | phosphoric acid, reagent grade assay: 86.9%, available from J. T. Baker, Phillipsburg, NJ |
| CSILB | colloidal silica, available under the trade designation "NALCO 1056" from Nalco Company, Naperville, IL |
| AMPHOS | 1.5 g of ammonium phosphate monobasic, assay: 99% (available from EMD Chemicals Inc., Gibbstown, NJ) diluted in 100 g of water |

Flexibility Test:

Two strips measuring (7 inches (18 cm) by 3.5 inches (9 cm)) are obtained from a material to be evaluated. One strip is wrapped around a 2.5-inch (6.4-cm) diameter steel mandrel with a treated surface (or an untreated surface if there are no treated surfaces) facing outward, and the other is wrapped around the same steel mandrel with the same surface facing inward. A specimen is considered to pass if both strips can be separately wrapped around the mandrel without cracking through the majority of the strip or breaking into large rigid segments. A minor amount of surface cracking is acceptable.

Preparation of Solutions 1-19

Solutions 1 to 19 were prepared by adding the ingredients reported in Table 2 (below) to 4-ounce sealed glass jars, and placing the sealed jars in an 80° C. oven until the solids dissolved. In Table 2, "g" refers to grams.

TABLE 2

| SOLUTION | COMPONENT | AMOUNT |
|---|---|---|
| 1 | MAP | 10 g |
|  | Water | 40 g |
|  | SURF | 1 drop |
| 2 | boric acid | 5 g |
|  | Water | 45 g |
|  | SURF | 1 drop |
| 3 | ammonium pentaborate octahydrate | 5 g |
|  | Water | 45 g |
|  | SURF | 1 drop |
| 4 | potassium tetraborate tetrahydrate | 5 g |
|  | Water | 45 g |
|  | SURF | 1 drop |
| 5 | boric acid | 5 g |
|  | CSIL | 5 g |
|  | Water | 45 g |
|  | SURF | 1 drop |
| 6 | boric acid | 5 g |
|  | CSIL | 10 g |
|  | Water | 45 g |
|  | SURF | 1 drop |
| 7 | boric acid | 5 g |
|  | CAL | 5 g |
|  | Water | 45 g |
|  | SURF | 1 drop |
| 8 | BX | 5 g |
|  | Water | 45 g |
|  | SURF | 1 drop |
| 9 | MGPHOS | used as received |
| 10 | CB671 | used as received |
| 11 | AS | 50 |
|  | SURF | 1 drop |
| 12 | RIGW | used as received |
| 13 | CSIL | 50 g |
|  | SURF | 1 drop |
| 14 | CAL | 50 g |
|  | SURF | 1 drop |
| 15 | PHOS | 10 g |
| 16 | PHOS | 10 g |
|  | Water | 10 g |
|  | CAL | 10 g |
| 17 | PHOS | 10 g |
|  | Water | 10 g |
|  | CSILB | 10 g |
| 18 | PHOS | 10 g |
|  | Water | 10 g |
|  | CSIL | 10 g |
| 19 | AMPHOS | 10 g |

Prior to use, the jars were shaken to ensure thorough mixing of the ingredients. Solution 10 is technically not a solution, but rather a thick pasty material. It is referred to as a solution in the Examples for editorial convenience only.

Examples 1A-17A and Comparative Examples A1-I1

Mounting material was cut into two 1.75 inch×1.75 inch (4.45×4.45 cm) square specimens using a steel rule die. A solution as indicated in Table 3 was applied to the top major surface of each of the two specimens using a disposable polyethylene eye-dropper. The coating weight was either 1 or 3 grams which correlates to 0.327 or 0.98 grams per square inch respectively (0.051 or 0.152 grams per square cm) The coating consisted of individual drops positioned evenly over the top major surface and did not penetrate to the opposite surface. After the coating was applied, the specimens were heated at 80° C. for at least 30 minutes until dry. After the specimens were dried, they were tested as follows.

For each example a test assembly was prepared by placing the treated sides of the two specimens against opposite sides of a new piece (2 inches (5 cm) by 10 inches (25 cm) by 3 mils (0.076 mm)) of 321 anneal stainless steel shim with a bright finish. About ¾ inch (2 cm) of the shim extended beyond the specimens. The specimens were held in place using a small piece of transparent tape. The test assembly was then clamped (the clamping force was 10 psi (69 kPa) vertically between two electrically heated platens (nickel-chromium alloy available under the trade designation "INCONEL 601" from Inco Alloys International) having a roughened surface and mounted on a force measurement device (available under the trade designation "INSTRON 4201" from Instron, Norwood, Mass.). Each platen had dimension of 2 inches×3 inches (5 cm×8 cm). The upper end of the stainless steel shim was clamped to a crosshead with pneumatic grippers positioned 6 inches (15 cm) directly above the lower platens. After the specimen was clamped into position, the platens were heated at 750° C. and held there for 4 minutes to burn off any organic binders. Then, the platens were cooled to 500° C. and held at 500° C. for five minutes. Then the crosshead of the force measurement device was raised at a rate of 4 inches per minute (10 cm per minute), the travel distance was 0.5 inches (1.27 cm). A load cell measured the force required to pull the stainless steel shim from between the two specimens. The peak force and failure mode were recorded. Results are reported in Table 3 (below).

TABLE 3

| EXAMPLE | SOLUTION | MAT | AMOUNT OF SOLUTION APPLIED TO MAT, grams | PEAK FORCE, lbs (N) | FAILURE MODE | FIBERS ADHERED TO SHIM, yes/no |
|---|---|---|---|---|---|---|
| 1A | 1 | MAT1 | 1 | 80.75 (359.2) | mat shear | yes |
| 2A | 2 | MAT1 | 1 | 81 (360) | mat shear | yes |
| 3A | 2 | MAT1 | 3 | 93.4 (415) | mat shear | yes |
| 4A | 2 | MAT2 | 3 | 60.7 (270) | mat shear | yes |
| 5A | 3 | MAT1 | 1 | 85.9 (382) | mat shear | yes |
| 6A | 4 | MAT1 | 1 | 91.6 (407) | mat shear | yes |
| 7A | 5 | MAT1 | 1 | 92.5 (411) | mat shear | yes |
| 8A | 6 | MAT1 | 1 g applied to each of both major surfaces, 2 g total | 94.3 (419) | mat shear | yes |
| 9A | 7 | MAT1 | 1 | 89.2 (398) | mat shear | yes |
| 10A | 8 | MAT1 | 1 | 90 (400) | mat shear | yes |
| 11A | 9 | MAT1 | 1 | 91.2 (406) | mat shear | yes |
| 12A | 2 | MAT3 | 3 | 82 (365) | mat shear | yes |
| 13A | 15 | MAT3 | 2 | 85.5 (380) | mat shear | yes |
| 14A | 16 | MAT3 | 2 | 81.1 (361) | mat shear | yes |
| 15A | 17 | MAT3 | 2 | 72.4 (322) | mat shear | yes |
| 16A | 18 | MAT3 | 2 | 71.0 (316) | mat shear | yes |
| 17A | 19 | MAT3 | 2 | 69.4 (309) | mat shear | yes |
| Comparative Example A1 | 10 | MAT1 | 1 | 93.7 (417) | mat shear | no |
| Comparative Example B1 | none | MAT1 | 0 | 60 (270) | shim slip | no |
| Comparative Example C1 | none | MAT2 | 0 | 51 (230) | shim slip | no |
| Comparative Example D1 | none | MAT3 | 0 | 54.2 (241) | shim slip | no |
| Comparative Example E1 | 11 | MAT2 | 1 | 47.5 (211) | shim slip | no |
| Comparative Example F1 | 12 | MAT1 | 1 | 60.2 (268) | shim slip | no |
| Comparative Example G1 | 12 | MAT1 | 3 | 61.7 (274) | shim slip | no |
| Comparative Example H1 | 13 | MAT1 | 1 | 53.4 (238) | shim slip | no |
| Comparative Example I1 | 14 | MAT1 | 1 | 56 (250) | shim slip | no |

The CB671 used in Comparative Example A1 was very thick and did not soak into the mat resulting in hard drops on the surface of the mat.

Examples 1B-17B and Comparative Examples A2-I2

Specimens were prepared by cutting material to be tested to dimensions of 7 inches (18 cm) by 7 inches (18 cm) using a steel rule die. One of Solutions 1-14 was applied dropwise and evenly over one entire major surface of the specimen until the desired amount of solution was applied using a disposable polyethylene eye-dropper. The test solution did not penetrate to the opposite major surface of the specimen. The coating weight was recorded. After application of the test solution, the coated specimens are dried in an 80° C. oven for a minimum of 30 minutes. Once dry, the specimen is allowed to cool to room temperature and was evaluated by the Flexibility Test. Results are reported in Table 4 (below).

TABLE 4

| EXAMPLE | SOLUTION | MAT | AMOUNT OF SOLUTION APPLIED TO MAJOR SURFACE OF SPECIMEN, grams | FLEXIBILITY TEST, treated side out pass/fail | FLEXIBILITY TEST, treated side in pass/fail |
|---|---|---|---|---|---|
| 1B | 1 | MAT1 | 16 | pass | Pass |
| 2B | 2 | MAT1 | 16 | pass | Pass |
| 3B | 2 | MAT1 | 48 | pass | Pass |
| 4B | 2 | MAT2 | 48 | pass | Pass |
| 5B | 3 | MAT1 | 16 | pass | Pass |
| 6B | 4 | MAT1 | 16 | pass | Pass |
| 7B | 5 | MAT1 | 16 | pass | Pass |

TABLE 4-continued

| EXAMPLE | SOLUTION | MAT | AMOUNT OF SOLUTION APPLIED TO MAJOR SURFACE OF SPECIMEN, grams | FLEXIBILITY TEST, treated side out pass/fail | FLEXIBILITY TEST, treated side in pass/fail |
|---|---|---|---|---|---|
| 8B | 6 | MAT1 | 16 g applied to each of both major surfaces, 32 g total | pass | Pass |
| 9B | 7 | MAT1 | 16 | pass | Pass |
| 10B | 9 | MAT1 | 16 | pass | Pass |
| 11B | 10 | MAT1 | 16 | pass | Pass |
| 12B | 2 | MAT3 | 48 | pass | Pass |
| 13B | 15 | MAT3 | 20 | pass | Pass |
| 14B | 16 | MAT3 | 26 | pass | Pass |
| 15B | 17 | MAT3 | 27 | pass | Pass |
| 16B | 18 | MAT3 | 26 | pass | Pass |
| 17B | 19 | MAT3 | 28 | pass | Pass |
| Comparative Example A2 | 11 | MAT1 | 16 | pass | Pass |
| Comparative Example B2 | none | MAT1 | 0 | pass | Pass |
| Comparative Example C2 | none | MAT2 | 0 | pass | Pass |
| Comparative Example D2 | none | MAT3 | 0 | pass | Pass |
| Comparative Example E2 | 12 | MAT2 | 16 | pass | Pass |
| Comparative Example F2 | 13 | MAT1 | 16 | pass | Pass |
| Comparative Example G2 | 13 | MAT1 | 48 | pass | Pass |
| Comparative Example H2 | 14 | MAT1 | 16 | pass | Pass |
| Comparative Example I2 | 15 | MAT1 | 16 | pass | Pass |

In Table 4, the coating weights of the Examples and Comparative Examples are equivalent to that in correspondingly numbered Examples in Table 3. That is, Example 1A in Table 3 has the same coating basis weight as Example 1B in Table 4, and Comparative Example A1 in Table 3 has the same coating basis weight as Comparative Example A2 in Table 4. The higher coating weights in Table 4 reflect a larger specimen size. The CB671 used in Comparative Example A2 was very thick and did not soak into the mat resulting in hard drops on the surface of the mat.

Various modifications and alterations of this invention may be made by those skilled in the art without departing from the scope and spirit of this invention, and it should be understood that this invention is not to be unduly limited to the illustrative embodiments set forth herein.

What is claimed is:

1. A securable mounting material comprising:
a mounting material comprising inorganic fibers and having first and second opposed major surfaces; and
a dry layer of a thermally activatable adhesive inwardly disposed on the inorganic fibers of the mounting material proximate at least a portion of the first major surface, but not extending throughout the entirety of mounting material;
wherein, on a dry weight basis, at least one compound represented by the formula comprises a majority of the thermally activatable adhesive, and wherein
each $M^{m+}$ independently represents a cationic species, other than $H^+$, having a positive charge of m+; and
$(Z_pO_q(OH)_r)^{n-}$ represents a species having a charge of n−, wherein Z represents boron, and further wherein:
f is a real number greater than or equal to zero;
d, n, q, and r are integers greater than or equal to zero;
e, m, and p are integers greater than or equal to one; and
d times m equals e times n; and
wherein the securable mounting material is flexible, and wherein the mounting material further comprises an unexpanded intumescent material.

2. The securable mounting material of claim 1, wherein the unexpanded intumescent material comprises vermiculite, graphite, or a combination thereof.

* * * * *

UNITED STATES PATENT AND TRADEMARK OFFICE
CERTIFICATE OF CORRECTION

PATENT NO. : 8,702,832 B2  Page 1 of 1
APPLICATION NO. : 12/663720
DATED : April 22, 2014
INVENTOR(S) : Peter Dietz

It is certified that error appears in the above-identified patent and that said Letters Patent is hereby corrected as shown below:

In the Specification

Column 2
Line 20, Delete "$(Z_pO_q\ (OH)_r)$" and insert -- $(Z_pO_q(OH)_r)$ --, therefor.

Column 2
Line 57, Delete "$(Z_pO_q\ (OH)_r)^{n-}$" and insert -- $(Z_pO_q(OH)_r)^{n-}$ --, therefor.

Signed and Sealed this
Sixteenth Day of December, 2014

Michelle K. Lee
*Deputy Director of the United States Patent and Trademark Office*